(12) United States Patent
Tikkanen et al.

(10) Patent No.: US 6,373,382 B2
(45) Date of Patent: Apr. 16, 2002

(54) BICYCLE THEFT PROTECTION SYSTEM

(76) Inventors: Vickie Tikkanen; Paul Tikkanen, both of 410 Palmerston Blvd., Toronto (CA), M6G 2N8

( * ) Notice: Subject to any disclaimer, the term of this patent is extended or adjusted under 35 U.S.C. 154(b) by 0 days.

(21) Appl. No.: 09/790,258

(22) Filed: Feb. 20, 2001

Related U.S. Application Data

(63) Continuation-in-part of application No. 09/249,228, filed on Feb. 11, 1999, now Pat. No. 6,191,685.

(51) Int. Cl.[7] .................................................. B62J 3/00
(52) U.S. Cl. ....................... 340/432; 340/426; 340/427; 70/39; 70/233
(58) Field of Search ................................ 340/427, 426, 340/432; 70/39, 233

(56) References Cited

U.S. PATENT DOCUMENTS

| | | | | |
|---|---|---|---|---|
| 3,824,540 A | * | 7/1974 | Smith, II | 180/114 |
| 4,571,965 A | * | 2/1986 | LeRoux | 70/227 |
| 4,776,188 A | * | 10/1988 | Dalaba et al. | 70/49 |
| 5,270,681 A | * | 12/1993 | Jack | 340/427 |
| 5,408,212 A | * | 4/1995 | Meyers et al. | 340/427 |
| 5,534,847 A | * | 7/1996 | McGregor | 340/432 |

* cited by examiner

*Primary Examiner*—Julie Lieu
(74) *Attorney, Agent, or Firm*—Ken J. Pedersen; Barbara S. Pedersen

(57) ABSTRACT

Embodiments of an alarm system are described, which may be mounted or built-in to a bicycle or other device which is in need of anti-theft protection. A loud alarm is connected to or mounted in the protected device, and is operatively connected to either or both: a lock that anchors the device to a stationary object, and/or parts of the protected device that might be stolen or vandalized. The alarm unit is built and wired in such a way that the lock or parts of the protected device may not be significantly tampered with or removed without triggering the alarm. Externally-mounted alarm units preferably include a weather-proof casing, which contains a unique clamping feature that makes the alarm tamper-resistant or tamper-proof. The alarm casing may contain a sound chamber that preferably amplifies the alarm sound, waterproofs the alarm component, and prevents a thief from muffling the sound. The alarm system's external wiring and cabling use a multiple wire system with some operative wires and some dummy wires to confuse a would-be thief.

26 Claims, 7 Drawing Sheets

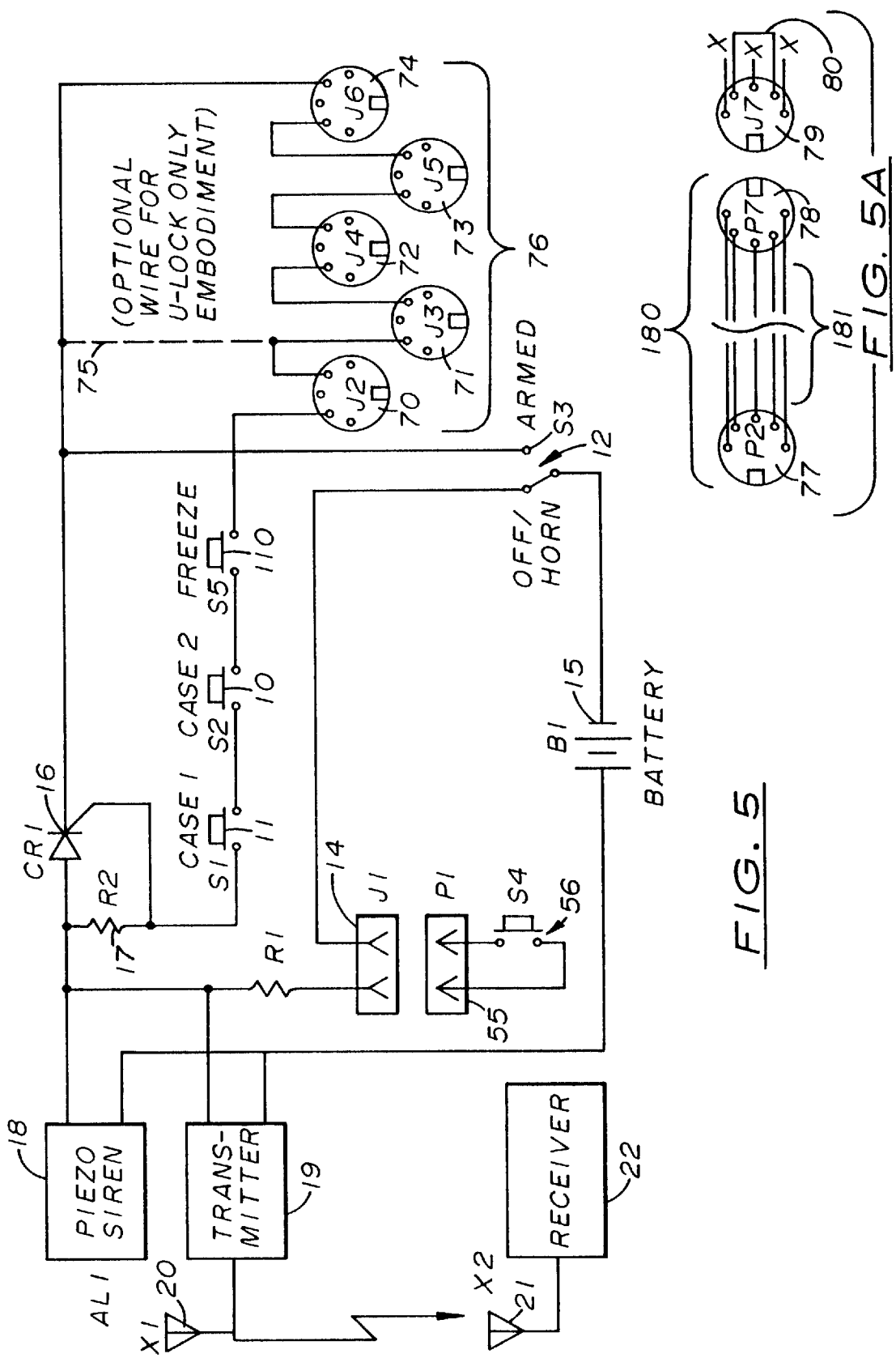

BICYCLE THEFT PROTECTION SYSTEM

This application is a continuation in part application of, and claims priority from, U.S. patent application Ser. No. 09/249,228, filed on Feb. 11, 1999, entitled "Bicycle Theft Protection System" the disclosure of which is incorporated herein by this reference, which is issuing on Feb. 20, 2001 as U.S. Pat. No. 6,191,685.

BACKGROUND OF THE INVENTION

1. Field of the Invention

Embodiments of the present invention relate to anti-theft devices for bicycles.

2. Related Art

As an introduction to the problems solved by the present invention, one may consider the fact that the bicycle anti-theft devices that are currently available, conventional cable lock and U-lock type devices, can be broken by using either bolt-cutters or metal cutting saws. Thieves have become proficient at rapidly removing these types of locks, making them less than fully secure. Crime statistics of rampant and widespread bicycle theft in the United States confirm that bicycle thefts typically are carried out by cutting of a conventional bicycle lock.

In view of the problem described above, the need exists for a better means of securing bicycles and deterring thieves.

SUMMARY OF THE INVENTION

Accordingly in the present invention, a loud alarm is connected to or mounted in a bicycle frame and is operatively connected to a bicycle lock and/or to parts of the bicycle, in such a way that the lock or bicycle parts may not be significantly tampered with or removed without triggering the alarm. The alarm system is adapted to sound if the lock or associated wiring is tampered with or if sensors transmit a signal that a bicycle part is being tampered with. Various styles of locks may be adapted for the invention, such as U-locks, cable locks, or others, and the locks may be one piece, such as a cable lock, or two-piece, such as a U-lock, or other designs.

In one group of externally-mounted embodiments, both the alarm unit and sensors and cables are mounted on the outside of the bicycle. In these externally-mounted units, the alarm includes a weather-proof casing, which contains a unique clamping feature that makes the alarm tamper-resistant or tamper-proof. The alarm casing may contain a sound chamber that preferably amplifies the alarm sound, waterproofs the alarm component, and prevents a thief from muffling the sound.

In another group of internally-mounted embodiments, the alarm is mounted inside the bicycle frame and sensors are mounted on the various bicycle parts that are frequently stolen, preferably with the sensors and wiring on the external surfaces of the bicycle, or, less-preferably, with the sensors and wiring in the internal channels of the bicycle frame and components.

According to one aspect of the invention, the alarm unit is preferably connected to a U-shaped lock on the bicycle, by means of a cable comprising multiple wires or conductors. The cable has a connector at each end, which connect the alarm to the lock but which can only be removed, without sounding the alarm, when the alarm is disabled. If the cable is disconnected when the alarm is enabled, the alarm is triggered and the loud alarm brings attention to the would-be thief.

Preferably all of the cabling, wiring, and connectors that are external parts of the invention, that is, at all accessible to a would-be thief, are adapted to be multiple-wire cabling, wiring, and connectors wherein only part of the multiple wires in the cable are operative. In other words, only a portion of the wires and connector pins connect to and are part of the electrical circuit of the alarm unit. The other wires or pins are "dummies". The dummy wires are physically parallel to the operative wires and visually indistinguishable from the operative wires, but not electrically connected. Likewise, the dummy pins in the connectors are positioned to look like they are operative, but they are constructed not to be operative. The electrical connection of the operative wires and non-connection of the dummy wires to the alarm system circuit is hidden from a would-be thief. The would-be thief is therefore confused as to what wires are operative, which presents a challenge to anyone attempting to short-circuit operative wires and/or cut the connection between the alarm and lock, or to short-circuit and/or cut the wiring on the bicycle lock, or between the various bicycle part sensors (described below). Because the thief cannot tell which of the multiple wires are active in the alarm circuit, he/she is slowed or completely prevented from disarming or dismantling any accessible part of the alarm system.

According to another aspect of the invention, the alarm casing may only be opened by a special key. This key provides access to the alarm battery and mounting means. If alarm unit removal is attempted by abusive means, such as by prying or hammering, internal momentary switches will trigger the alarm.

Several embodiments may be designed to add special features to the invented system. A transmitter that signals an owner's receiver when the alarm is triggered may be mounted inside the alarm unit. Sensors may be mounted on the handle bar stem, the seat post, and on each wheel hub to prevent those vehicle parts from being removed without triggering the alarm. Wiring for such sensors may be done as internal wiring and sensors during manufacture of the bicycle, if the bicycle is adapted for internal wiring, but external wiring is more likely to be feasible.

The preferred alarm device also acts as a horn, with the siren having a dual-use as both theft alarm and signaling horn. The horn feature is enabled whenever the alarm is disabled, and vice versa, resulting in the invention having dual uses for added convenience and economy.

These and other embodiments, aspects, advantages and features of the present invention will be set forth in part in the description which follows, and in part will become apparent to those skilled in the art by reference to the following description of the invention and referenced drawings, or by practice of the invention. The aspects, advantages and features of the invention are also realized and attained by means of the instrumentalities, procedures, and combinations particularly pointed out in the appended claims.

BRIEF DESCRIPTION OF THE DRAWINGS

FIG. 5 is a schematic diagram of one embodiment of the alarm circuit of the present invention.

FIG. 5a is a schematic diagram of one external cable and sensor.

DESCRIPTION OF THE PREFERRED EMBODIMENTS

Referring to the Figures, there are shown several, but not the only, embodiments of the invented alarm system for bicycles. The alarm system 100 may be of two general mounting types: 1) an externally-mounted type, in which the alarm unit and associated sensors and wiring are substantially on the outside of the bicycle and in which the alarm unit is encased for weather protection, or 2) an internally-mounted type, in which the alarm unit is mounted inside the bicycle frame and, preferably but not necessarily, the sensors and wiring are mounted on the outside of the bicycle frame. In each of these types, the wiring may be strapped onto the frame, wrapped, or otherwise secured.

Alternatively, a third type of alarm system is envisioned, that is, an embodiment in which all of the system is substantially internal, that is, alarm unit, sensors and wiring are enclosed inside the bicycle frame. Such embodiments are expected to result in difficulties in properly installing the wiring to extend into the various parts of the bicycle, and so such embodiments are less preferred.

Figure 1:
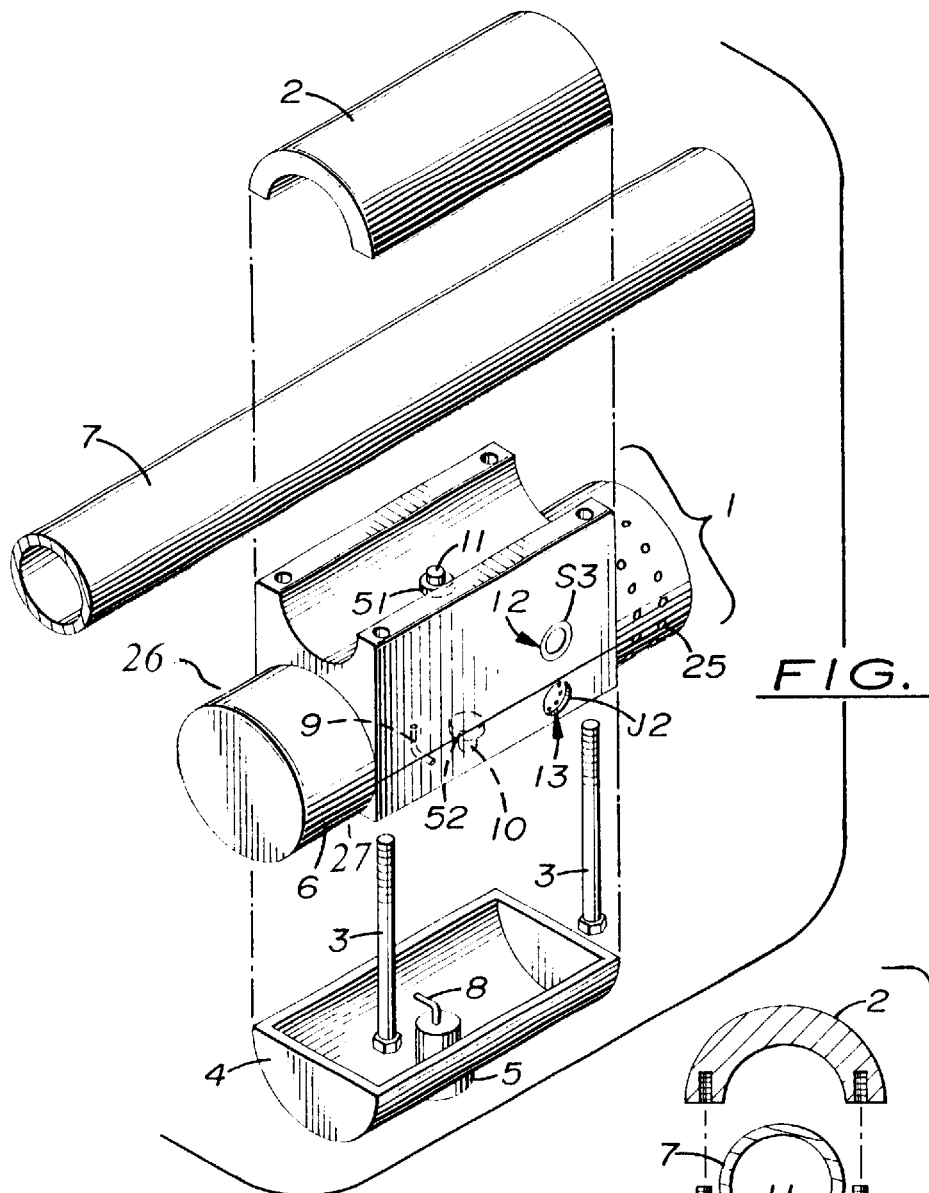
FIG. 1 is a side view of one embodiment of the invented alarm chassis assembly and related components.
Figure 1A:
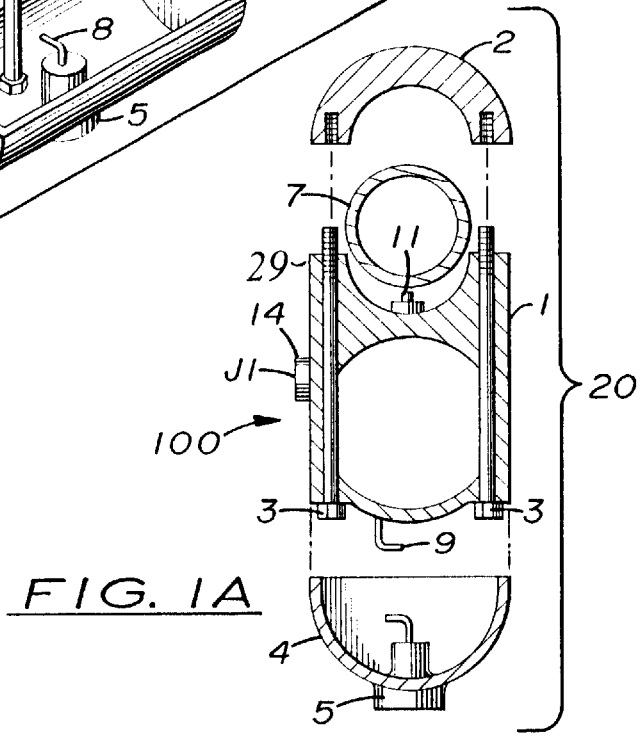
FIG. 1a is a front view of the alarm chassis assembly and related components of the embodiment of FIG. 1.

FIG. 1 is a side view and FIG. 1a is a front view of the preferred alarm chassis assembly and related components of the externally-mounted embodiment, wherein a clamp system securely connects the alarm unit to a portion of a bicycle frame. The preferred clamp system includes a clamp that is made of two clamp members that connect around the bicycle frame and bolts that connect the two clamp members. The main chassis 1, which houses the main circuitry and alarm siren, and is constructed of two case halves 26, 27 which are die-cast or machined from a suitable metal or plastic material, plus a bottom clamp member 29. Case halves 26, 27 form a generally cylindrical casing, which is secured, either by integral construction or other secure means, to the bottom clamp member 29, so that, in effect, the case halves 26, 27 and bottom clamp member 29 form the "main chassis" 1. One-piece top clamp member 2 is a strong, preferably semi-cylindrical member adapted to curve part way around a portion of a bicycle frame. The top end of the bottom clamp member 29 is also preferably semi-cylindrical in shape for extending around the side of the bicycle frame opposite the top clamp member 2.

Four clamp bolts 3 pass through the bottom clamp member 29, with the bolt heads underneath the bottom clamp member opposite the top clamp member 2 and preferably being the only portion extending out from the clamp. The bolts 3 thread into four threaded holes in the top clamp member 2. In this way, the main chassis 1 is secured to the bicycle frame 7 securely and in a way that allows only a portion of the connectors/fasteners (bolts 3) to extend out from the clamp outer surface.

Cover 4 is used to cover and prevent access to the portion of the bolts extending out from the clamp. Cover 4 is secured to the main chassis 1 by placing cover 4 up against the bottom of the bottom clamp member 29, turning key-operated cam lock 5, and engaging latch 8 to closure 9. The cover therefore covers and hides the heads of the bolts, the bottom clamp member 29 covers and hides the shaft of the bolts, and the top clamp member 2 covers and hides the threaded ends of the bolts. The cover 4, with its lock system 5,8,9, allows the owner of the bicycle access to the battery compartment 6 and clamp bolts 3, while also preventing entry by would-be thieves. The cover 4, therefore, serves as a battery and clamp bolt protector means and access means, and also a transmitter holder or holder for other features such as a smoke or other dispenser.

Keyswitch 12, which serves to "arm" the alarm, is preferably operated by the same key as cam lock 5. In another embodiment, the keyswitch and cam lock may be one and the same component.

Two momentary switches 10, 11 are mounted on the top and bottom of the main chassis 1. When cover 4 and top clamp member 2 are installed, that is, when the bolts 3 are tightened to connect the main chassis to the top clamp member, around the bicycle frame, and when the cover is installed, the two normally open switches are set to their closed position by pressing against frame 7 and cover 4, as may best be seen in FIG. 1. If the keyswitch 12 is set to the armed position when the lock assembly is forced open by cutting or prying, for example, then the alarm will trigger (that is, sound).

Figure 2:
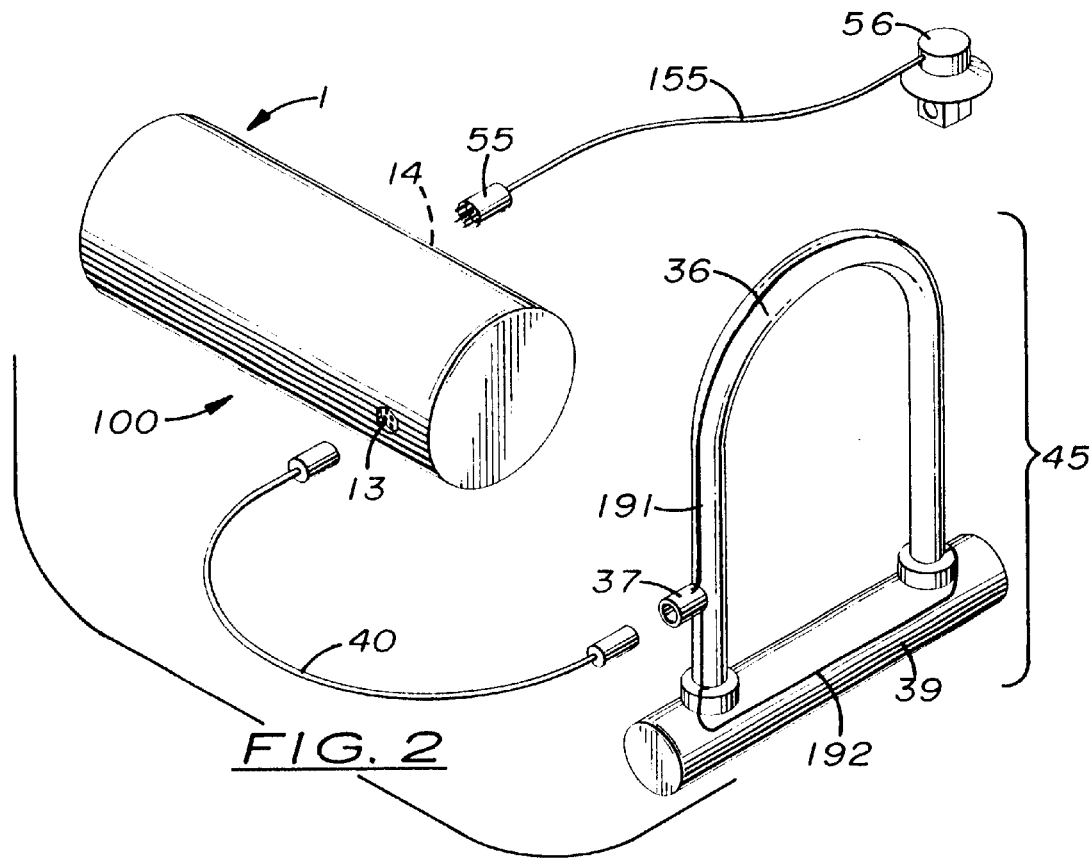
FIG. 2 is an assembly drawing of the alarm unit and external components of an externally-mounted embodiment of the invention.

FIG. 2 is an assembly drawing of the alarm unit and external components of the externally-mounted embodiment, with a U-shaped lock shown as an example of the various styles of locks that may be used with the alarm unit. Horn button 56 connects through cable 155 and connector 55 to jack 14. U-lock assembly 45 connects to cable 40 at connector 37, and 5-pin male cable 40 connects to 5-pin female jack 13. In this way, the U-lock assembly wiring (including 191, 192, 37) connects to cable 40, and cable 40 connects to the alarm unit. When the two lock members (36,39) are closed, the U-lock assembly wiring 191,192 connect to each other and to connector 37, which completes a circuit to the alarm unit. With the two lock members locked together, therefore, and the cable 40 in place, the alarm system's electrical circuit is closed and the alarm does not sound. If the lock members are separated or the U-lock assembly wiring is cut, the electrical circuit is broken and the alarm sounds.

In FIG. 2, the U-lock assembly wiring is shown as applied generally straight along the outer surface of the U-lock components 36 and 39. Preferably, a coating or other encasement would be applied over the wiring to protect it and make the U-lock assembly attractive.

Figure 3:
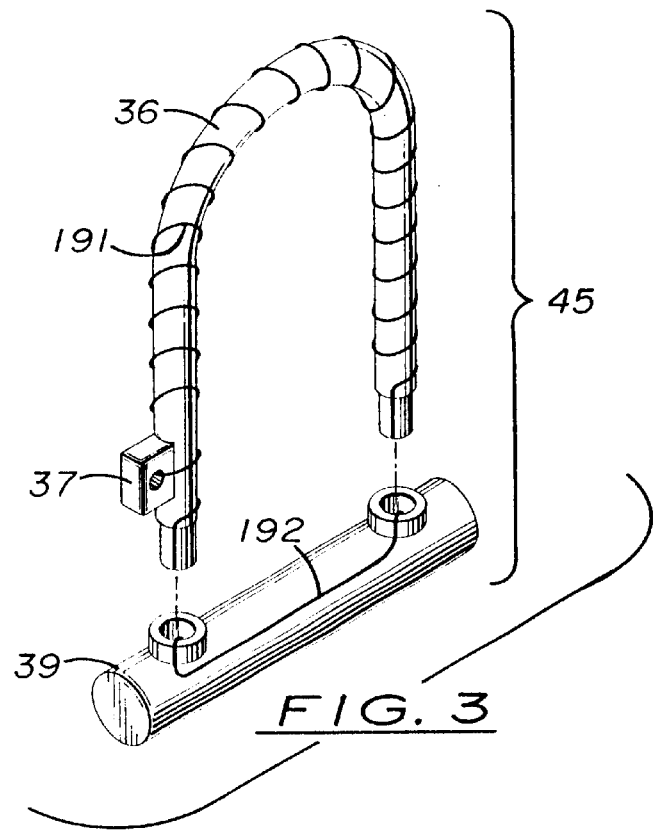
FIG. 3 is a side view of one embodiment of a U-lock assembly adapted for use with the invented alarm system.

FIG. 3 is a perspective view of another U-lock assembly 45 of the present invention. As in the embodiment of FIG. 2, the U-shaped lock bar 36 and bolt 39 are specially wired to close the circuit, when the two lock members (36,39) are closed, to connector 37, and, hence, to the alarm unit. In FIG. 3, the U-lock assembly wiring (191,192) is shown as wrapped around the members of the U-lock, and this wiring may be covered for protection and aesthetics.

Figure 4:
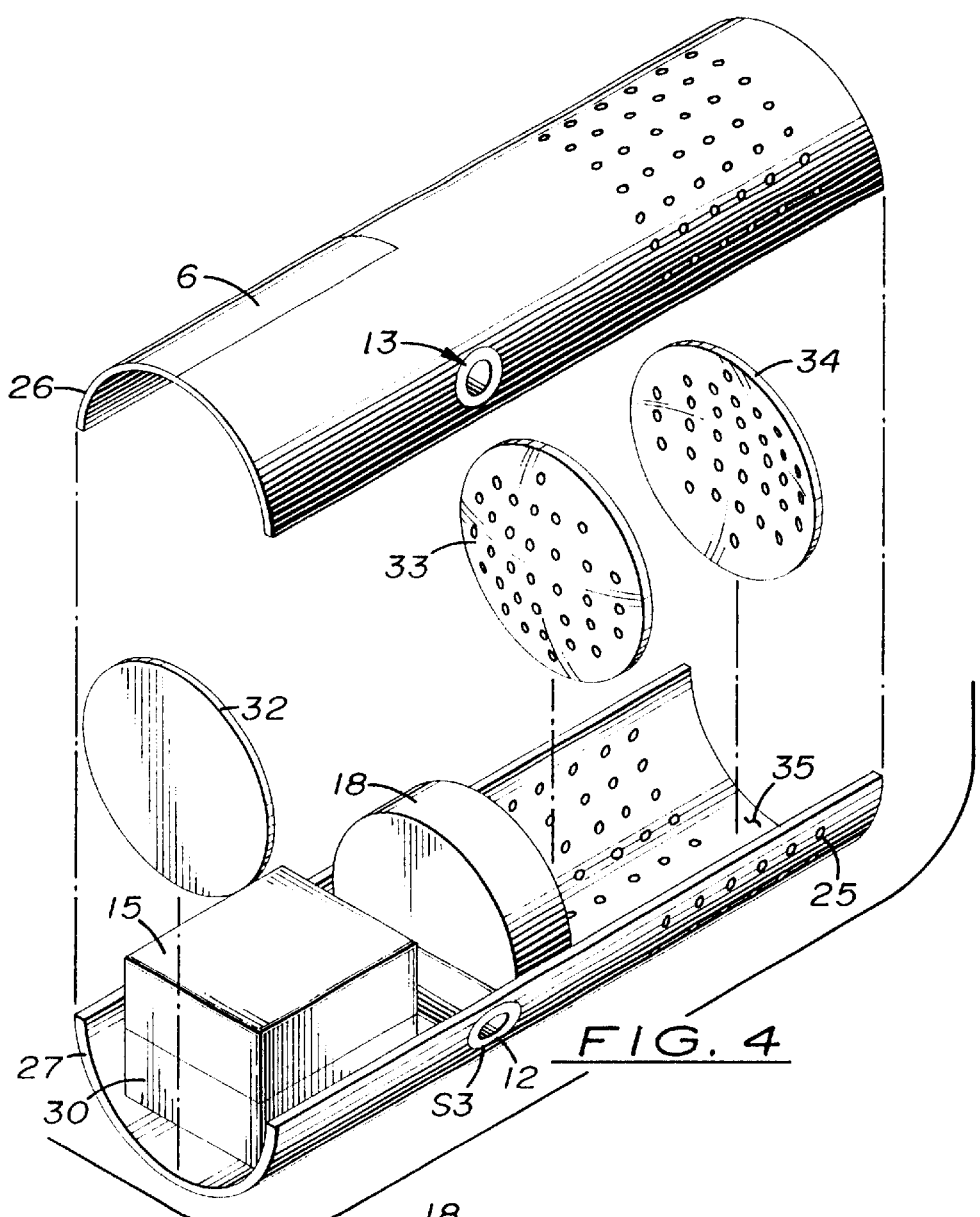
FIG. 4 is an exploded view of the alarm unit chassis of FIG. 1, adapted for use with the U-lock assembly of FIG. 3.
Figure 4A:
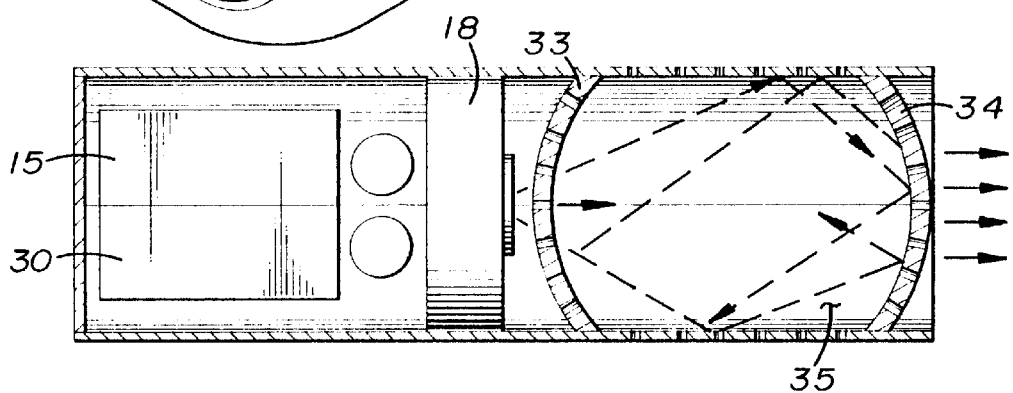
FIG. 4a is a side view of the alarm unit of FIG. 4, showing the perforated discs and piezo-siren installed in the alarm unit case, and schematically showing the sound travel between the discs and out of the alarm unit right end.

FIG. 4 shows case halves 26, 27 separated to reveal battery 15, circuit 30 and piezoelectric siren 18. Sound chamber 35 is formed by the sandwiching of two perforated discs 33, 34 between case halves 26 and 27 containing sound holes 25. As best illustrated in FIG. 4a, perforated disc 33 is preferably concave when viewed from the right end of the case in FIG. 4a, and disc 34 is preferably convex when viewed from the right end of the case in FIG. 4a. The concave and convex shapes serve to provide curved, perforated walls around the sound chamber, which enhance sound travel, as illustrated by the dashed sound travel arrows in FIG. 4a. A feature of this invention is that the alarm cannot easily be muffled, due to the multiplicity of holes surrounding the sound chamber 35. Case halves 26, 27 are welded by suitable means along their outer seams and also to solid disc 32 and perforated discs 33, 34. One perforated disc 33 is preferably about half way along the longitudinal axis of the elongated alarm unit, that is, about in the middle of the alarm unit. The second disc 34 is at or near the end of the elongated alarm unit.

FIG. 5 is a schematic diagram of one embodiment of the alarm circuit of the present invention. The circuit will activate piezoelectric siren 18 and transmitter 19 whenever the silicon-controlled rectifier (SCR) is triggered. Triggering occurs in the Off/Horn mode only when the momentary horn switch 56 is closed. In the armed mode, the SCR will trigger when either switch 10 or 11 is open or when temperature switch 110 is open, or when an open circuit occurs at any device connected to connectors 70, 71, 72, 73, and 74. The purpose of temperature switch 110 is to trigger an alarm if a would-be thief sprays the alarm system with freeze spray, in an attempt to immobilize the alarm or crack the case 1 by making the metal brittle. Front-wheel sensor 50, rear-wheel sensor 51, handlebar sensor 52, and seat-post sensor 53 are essentially wired in series with the U-lock assembly through connectors 70, 71, 72, 73, and 74, such that if any switch is opened the alarm will trigger.

In a simpler embodiment, having no wheel, seat-post or handle-bar sensors, but only a u-lock sensor, jumper wire 75 can be installed, and connector group 76 can be eliminated from the circuit. Connector 14 (J1) connects to horn switch plug 55 (P1). If optional transmitter 19 is enabled and the alarm is triggered, the transmitter 19 will send a signal via antenna 20 to the alarm owner's receiver 22 via receiver antenna 21. The entire circuit is powered by battery 15.

In an alternative embodiment, a panic alert on/off switch (not shown) is wired in parallel to the momentary horn switch 56. The momentary horn switch 56 serves to sound the horn only while the switch 56 is being pressed, for example, as a warning to pedestrians or other bicyclists. On the other hand, the optional panic alert switch can be hit once and it will cause the horn to sound continuously until turned off by the user, for example, for signaling for help during an accident or injury in a remote area or during (or to help prevent) an attack by a thug in a remote or dark area.

Figure 9:
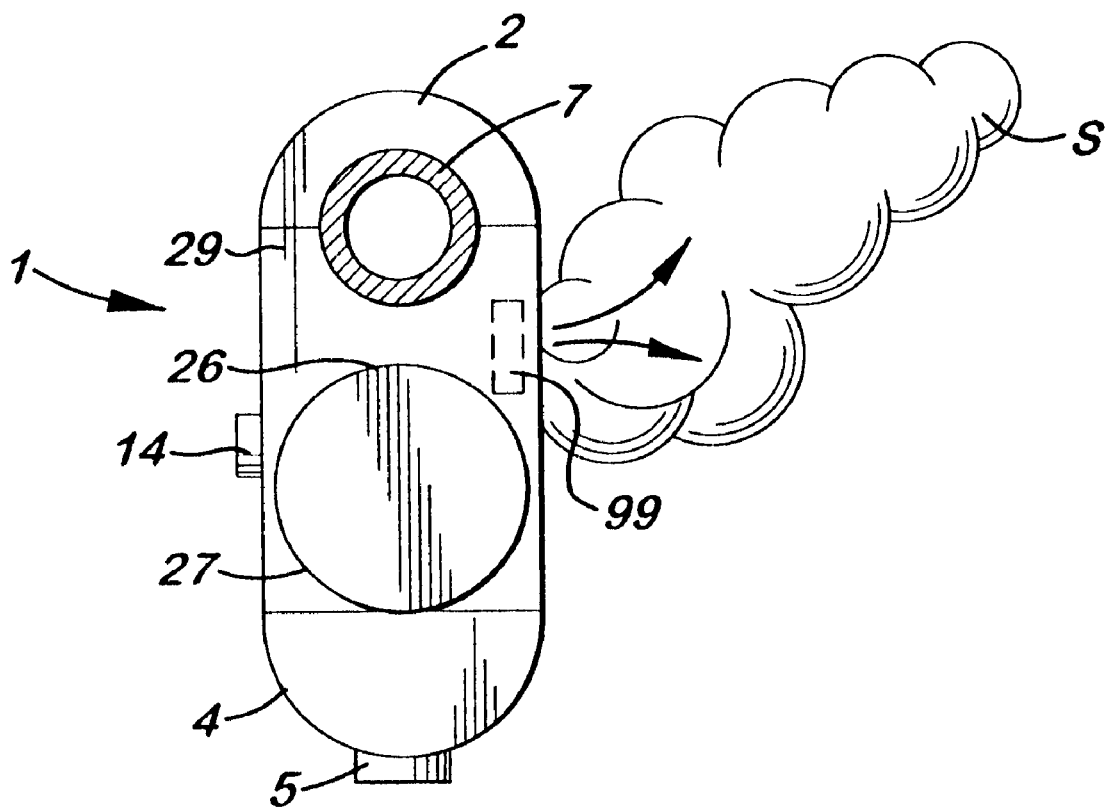
FIG. 9 is a schematic view of the alarm chassis assembly of FIGS. 1 and 1A installed on a bicycle frame, including a smoke discharge.

In an alternative embodiment, a time delay and small colored smoke charge can be added to the invention. The timer may be wired to the output of the alarm circuit. When the alarm is triggered to sound, the timer begins counting to a pre-set time. If the alarm is not turned off within the set time by the owner's key, voltage will be applied to the electric match, thus, igniting the smoke generating material to produce a smoke cloud. The smoke charge 99 may be placed in the chassis, as shown schematically in FIG. 9, preferably in a bottom cavity (not shown) of the bottom clamp member 29 to discharge smoke S through small holes (not shown) in the bottom clamp member.

Preferably, a multiple-wire system including operative wires and dummy wires is used for some, and preferably all, of the wiring in the invention that is reachable by a would-be thief. Preferably, the U-lock assembly wiring, the cables connecting the U-lock assembly to the alarm unit, the horn cable, and the cabling connecting the various bicycle part sensors to the alarm unit are all of the type illustrated in the example of FIG. 5a. FIG. 5a is a schematic diagram illustrating one embodiment of an external cable and sensor used in the invention.

Cable 180 wiring shown in FIG. 5a is constructed using 5-conductor cable 181. Connector plug P2 (77) connects to connector jack J2 (70). The sensor circuit is completed by the connection of plug P7 (78) to jack J7 (79), which features jumper 80, internally connected to close the loop. Actually, only two wires of those shown in FIG. 5a are required to complete the circuit and the other three are "dummy wires". This is intended to prevent someone from easily shorting wires on the U-lock, between the alarm and the U-lock, or between the alarm unit and the external sensors, in an attempt to keep the alarm from triggering while the U-lock is broken open or other cabling is cut. By using 5 wires, it is difficult to guess which two wires are the ones to short-out. Cutting the wires one at a time to find the two live wires would take too long and almost certainly trigger the alarm. In alternative embodiments, more or fewer wires may be used in the cabling, preferably, as long as two live wires and at least one dummy wire are present. Most preferably, at least five wires are used, with two being operative and three being connected, but additional dummy wires may be desirable options.

Figure 6:
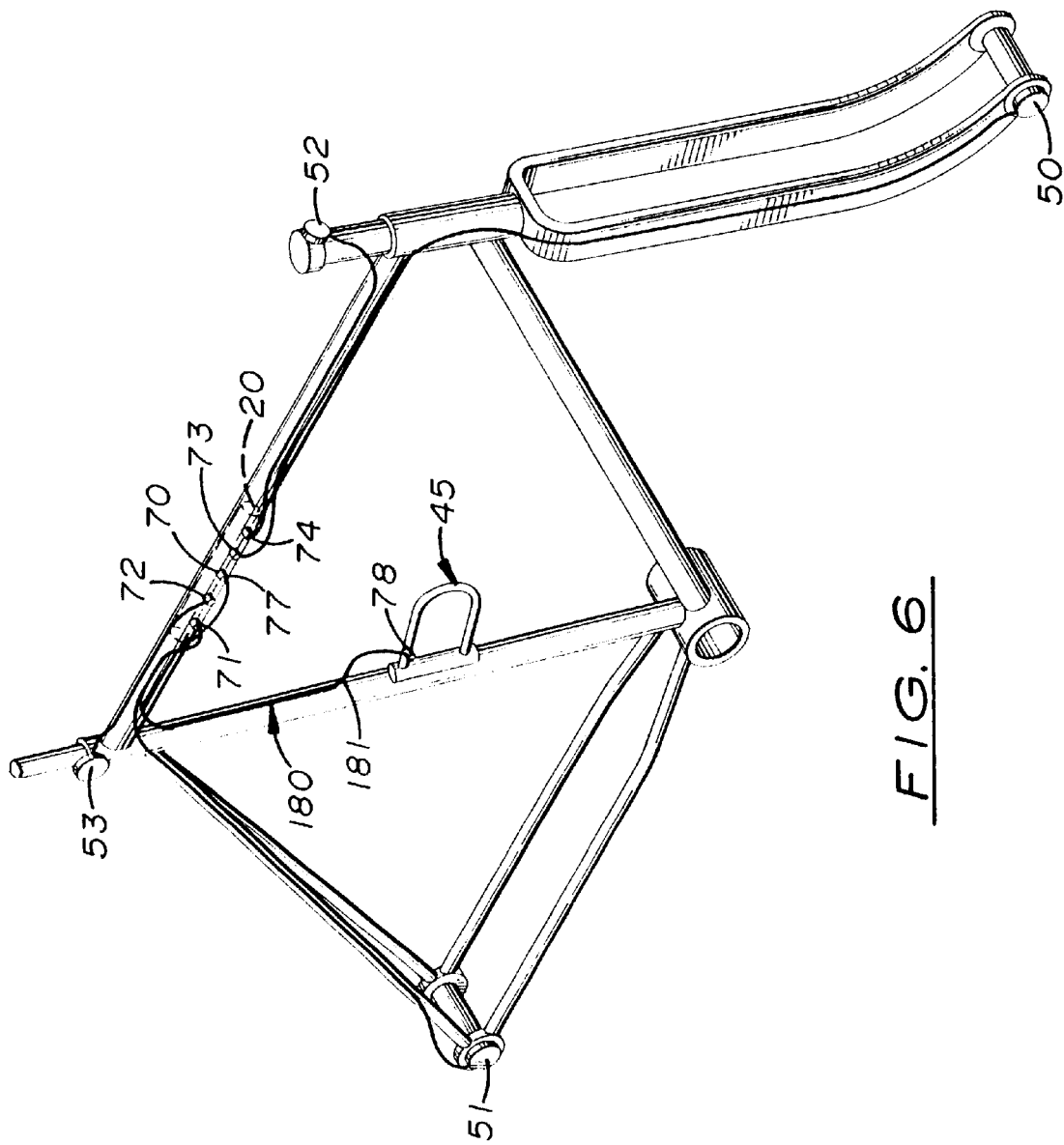
FIG. 6 is a front perspective view of a bicycle with one embodiment of the present built-in alarm invention, an internally-mounted alarm unit with external cables and sensors.

FIG. 6 is a plan view of the built-in, "internal" alarm embodiment, in which the alarm unit 20 is inside the top tube of the bicycle frame, and the connectors 70, 71, 72, 73, and 74 extend from the alarm unit 20 to pass through the frame wall, to curve along or wind around the frame external surface, and to reach to the external sensors 50, 51, 52, 53. FIG. 6 shows preferred location of sensors 50, 51, 52, 53, U-lock 45, alarm unit assembly 20, and connectors 70, 71, 72, 73, and 74. U-lock cable 180, with its component connectors 77, 78 and wire 181, are also shown.

Figure 7:
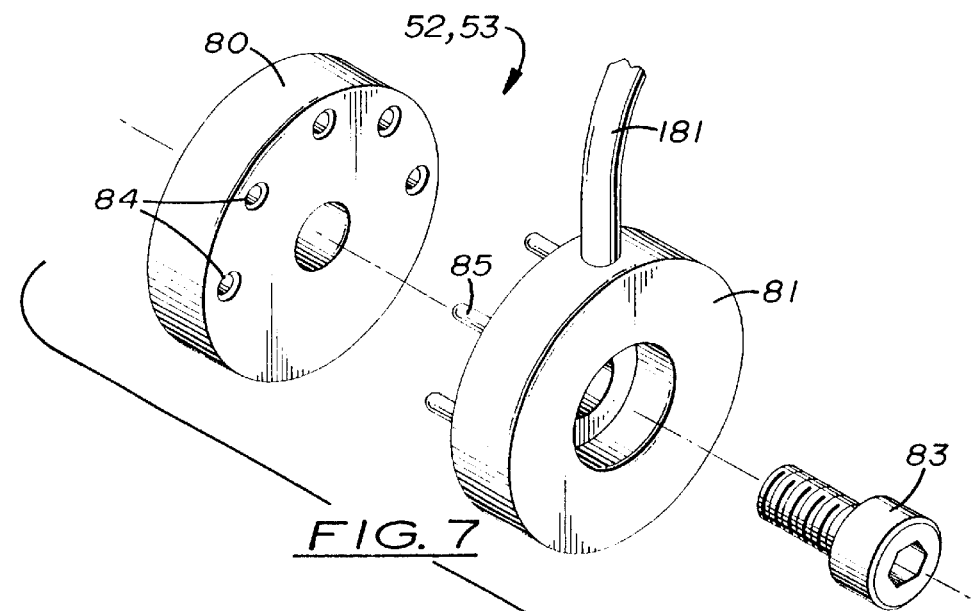
FIG. 7 is an exploded view of a seat-post and handle-bar type of sensor assembly.

FIG. 7 is an exploded view of a seat-post and handle-bar type of sensor assembly. Jack 80 is fixed to the seat-post. When bolt 83 is tightened, to lock down the handle-bar stem or seat-post, then the pins 85 of plug 81 align with the sockets 84 of jack 80 and a connection is made through cable 181 back to the alarm circuit.

Figure 8:
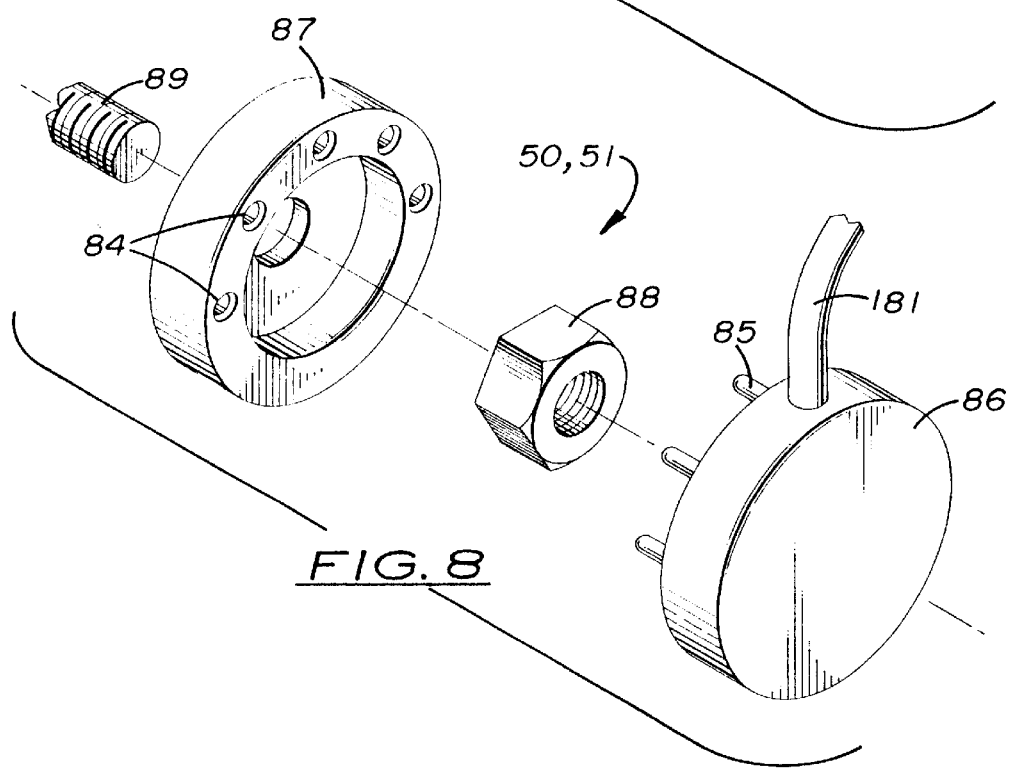
FIG. 8 is an exploded view of a wheel-nut sensor assembly.

FIG. 8 is an exploded view of a wheel-nut sensor assembly. In a similar fashion to jack 80 being fixed to a seat-post, jack 87 is fixed to the wheel axle. When nut 88 is tightened, to lock down the wheel, then the pins 85 of pug 86 align with the sockets 84 of jack 87 and a connection is made through cable 181 back to the alarm circuit.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure and practice of the invention to one of ordinary skill in the art to which the invention applies.

We claim:

1. A bicycle alarm system comprising:
   a bicycle lock;
   an alarm unit comprising a siren; and
   a connector for connecting the alarm unit to the bicycle lock; and
   a clamp system for connecting the alarm unit to a bicycle frame;
   wherein the bicycle, connector, and alarm unit are adapted to complete an electrical circuit when the bicycle lock is closed so that the alarm siren does not sound when the bicycle lock is closed, and so that the alarm siren sounds when the bicycle lock is opened;
   wherein the bicycle lock is a two-piece lock with a bar and a bolt that lock together and wiring on the outer surface of the bar electrically connects with wiring on the bolt when the bar and bolt are locked together.

2. An alarm system as in claim 1, wherein the alarm unit is elongated and has a middle area along its longitudinal axis and two ends, wherein the alarm unit comprises a plurality of perforated discs received in the sound chamber, wherein at least one of said discs is concave and positioned at or near said middle area and at least one disc is convex and is positioned at or near one of said two ends.

3. An alarm system as in claim 1 further comprising:
   a bicycle comprising a frame and a plurality of bicycle parts including wheels, handle bars, and seat; and
   sensors attached to a plurality of said bicycle parts and connectors between the sensors and the alarm unit adapted to signal the alarm unit to trigger the siren when said bicycle parts are moved.

4. An alarm system as in claim 3, wherein the connectors between the sensors and the alarm unit are located substantially outside the bicycle frame.

5. An alarm system as in claim 3, wherein the sound chamber has a plurality of holes for allowing sound out of the sound chamber.

6. An alarm system as is in claim 1, wherein the alarm unit further compromises momentary switches which trigger the siren to sound when the alarm unit is impacted or twisted.

7. An alarm system as in claim 1, wherein the alarm unit is elongated and has a middle area along its longitudinal axis and two ends, wherein the alarm unit comprises a plurality of perforated discs received in the sound chamber, wherein at least one of said discs is concave and positioned at or near said middle area and at least one disc is convex and is positioned at or near one of said two ends.

8. An alarm system as in claim 1, wherein the clamp system comprises a clamp including a first member and a second member adapted to surround a portion of a bicycle frame, a plurality of bolts securing the first member and second member around the portion of the bicycle frame, wherein only a portion of the bolts extend out from the clamp.

9. An alarm system as in claim 1, further comprising a smoke charge adapted to discharge smoke after the alarm siren sounds.

10. A bicycle alarm system comprising:
    a bicycle lock;
    an alarm unit comprising a siren; and
    a connector for connecting the alarm unit to a bicycle; and
    a clamp system for connecting the alarm unit to a bicycle frame;
    wherein the bicycle, connector, and alarm unit are adapted to complete an electrical circuit when the bicycle lock is closed so that the alarm siren does not sound when the bicycle lock is closed, and so that the alarm siren sounds when the bicycle lock is opened;
    wherein the connector between the alarm unit and the lock comprises multiple wires, wherein a portion of said wires complete said electrical circuit and a portion of said wires are dummy wires not electrically connected to said electrical circuit, so that it is not apparent to a thief which portion of the wires are electrically connected to said electrical circuit.

11. An alarm system as in claim 10, further comprising:
    a bicycle comprising a frame and a plurality of bicycle parts including wheels, handle bars, and seat; and
    sensors attached to a plurality of said bicycle parts and connectors between the sensors and the alarm unit adapted to signal the alarm unit to trigger the siren when said bicycle parts are moved.

12. An alarm system as in claim 10, wherein the alarm unit further comprises momentary switches which trigger the siren to sound when the alarm unit is impacted or twisted.

13. An alarm system as in claim 10, wherein the clamp system comprises a clamp including a first member and a second member adapted to surround a portion of a bicycle frame, a plurality of bolts securing the first member and second member around the portion of the bicycle frame, wherein only a portion of the bolts extend out from the clamp.

14. An alarm system as in claim 10, further comprising a smoke charge adapted to discharge smoke after the alarm siren sounds.

15. A bicycle alarm system comprising:
    a bicycle lock;
    an alarm unit comprising a siren; and
    a connector for connecting the alarm unit to a bicycle; and
    a clamp system for connecting the alarm unit to a bicycle frame;
    wherein the bicycle, connector, and alarm unit are adapted to complete an electrical circuit when the bicycle lock is closed so that the alarm siren does not sound when the bicycle lock is closed, and so that the alarm siren sounds when the bicycle lock is opened;
    wherein the bicycle lock is adapted to complete an electrical circuit by means of wiring placed on an outer surface of the bicycle lock;
    wherein the wiring placed on the outer surface of the lock comprises multiple wires, wherein a portion of said wires complete said electrical circuit and a portion of said wires are dummy wires not electrically connected to said electrical circuit, so that it is not apparent to a thief which portion of the wires are electrically connected to said electrical circuit.

16. An alarm system as in claim 15, further comprising:
    a bicycle comprising a frame and a plurality of bicycle parts including wheels, handle bars, and seat; and
    sensors attached to a plurality of said bicycle parts and connectors between the sensors and the alarm unit adapted to signal the alarm unit to trigger the siren when said bicycle parts are moved.

17. An alarm system as in claim 15, wherein the alarm unit further comprises momentary switches which trigger the siren to sound when the alarm unit is impacted or twisted.

18. An alarm system as in claim 15, wherein the alarm unit is elongated and has a middle area along its longitudinal axis and two ends, wherein the alarm unit comprises a plurality of perforated discs received in the sound chamber, wherein at least one of said discs is concave and positioned at or near said middle area and at least one disc is convex and is positioned at or near one of said two ends.

19. An alarm system as in claim 15, wherein the clamp system comprises a clamp including a first member and a second member adapted to surround a portion of a bicycle frame, a plurality of bolts securing the first member and second member around the portion of the bicycle frame, wherein only a portion of the bolts extend out from the clamp.

20. An alarm system as in claim 15, further compromising a smoke charge adapted to discharge smoke after the alarm siren sounds.

21. A bicycle alarm system comprising:
   a bicycle comprising a frame and a plurality of bicycle parts including wheels, handle bars, and seat;
   a bicycle lock;
   an alarm unit comprising a siren;
   a clamp system for connecting the alarm to a bicycle frame;
   a connector for connecting the alarm unit to the bicycle lock;
   sensors attached to a plurality of said bicycle parts and connectors between the sensors and the alarm unit adapted to signal the alarm unit to trigger the siren when said bicycle parts are moved from the bicycle;
   wherein the connector between the alarm unit and the sensors comprises a multiple of wires, wherein a portion of the wires complete a circuit between the sensors and the alarm unit and a portion of the wires are dummy wires not electrically connected to the alarm unit, so that it is not apparent to a thief which portion of the wires are electrically connected.

22. An alarm system as in claim 21, wherein the alarm unit further comprises momentary switches which trigger the siren to sound when the alarm unit is impacted or twisted.

23. An alarm system as in claim 10, wherein the alarm unit is elongated and has a middle area along its longitudinal axis and two ends, wherein the alarm unit comprises a plurality of perforated discs received in the sound chamber, wherein at least one of said discs is concave and positioned at or near said middle area and at least one disc is convex and is positioned at or near one of said two ends.

24. An alarm system as in claim 21, wherein the alarm unit is elongated and has a middle area along its longitudinal axis and two ends, wherein the alarm unit comprises a plurality of perforated discs received in the sound chamber, wherein at least one of said discs is concave and positioned at or near said middle area and at least one disc is convex and is positioned at or near one of said two ends.

25. An alarm system as in claim 21, wherein the clamp system comprises a clamp including a first member and a second member adapted to surround a portion of the bicycle frame, a plurality of bolts securing the first member and second member around the portion of the bicycle frame, wherein only a portion of the bolts extend out from the clamp.

26. An alarm system as in claim 21, further comprising a smoke charge adapted to discharge smoke after the alarm is triggered to sound.

* * * * *